United States Patent [19]

Ogino et al.

[11] Patent Number: 5,583,837
[45] Date of Patent: Dec. 10, 1996

[54] AUTOMATIC LOOP GAIN CONTROL APPARATUS

[75] Inventors: Tsukasa Ogino; Hisatoshi Baba, both of Kawasaki, Japan

[73] Assignee: Canon Kabushiki Kaisha, Tokyo, Japan

[21] Appl. No.: 409,633

[22] Filed: Mar. 22, 1995

Related U.S. Application Data

[63] Continuation of Ser. No. 154,391, Nov. 18, 1993, abandoned, which is a continuation of Ser. No. 685,639, Apr. 16, 1991, abandoned.

[30] Foreign Application Priority Data

Apr. 17, 1990 [JP] Japan ................................ 2-099341
Aug. 2, 1990 [JP] Japan ................................ 2-206134

[51] Int. Cl.⁶ .................................................. G11B 7/00
[52] U.S. Cl. ................................. 369/44.36; 369/44.28
[58] Field of Search ............................ 369/44.34, 44.35, 369/44.36, 44.25, 44.29, 124, 32

[56] References Cited

U.S. PATENT DOCUMENTS

| | | | |
|---|---|---|---|
| 4,858,214 | 8/1989 | Baba | 369/32 |
| 4,878,211 | 10/1989 | Suzuki et al. | 369/44.35 |
| 4,955,011 | 9/1990 | Baba | 369/32 |
| 5,056,074 | 10/1991 | Tateishi et al. | 369/44.28 |
| 5,073,885 | 12/1991 | Ito et al. | 369/44.36 |
| 5,235,577 | 8/1993 | Osino | 369/32 |

FOREIGN PATENT DOCUMENTS

| | | |
|---|---|---|
| 0220039 | 4/1987 | European Pat. Off. . |
| 0227445 | 7/1987 | European Pat. Off. . |
| 60-022746 | 2/1985 | Japan . |
| 1-169603 | 7/1989 | Japan . |
| 1169603 | 7/1989 | Japan . |

*Primary Examiner*—Nabil Z. Hindi
*Attorney, Agent, or Firm*—Fitzpatrick, Cella, Harper & Scinto

[57] ABSTRACT

An automatic loop gain control apparatus in a servo control apparatus of a closed loop arrangement which positions a control object with respect to a reference. The apparatus includes an adder for adding a reference signal of a predetermined frequency to a control signal in the closed loop, a first detector for detecting a peak value of predetermined frequency components of the control signal in a state before the control signal is input to the adder at every predetermined cycle, a second detector for detecting a peak value of predetermined frequency components of an output output from the adder at every predetermined cycle, and a digital signal processor for performing a digital computation using the peak value detected by the first detector and the peak value detected by the second detector and for adjusting the gain of the control loop on the basis of the result of the computation.

13 Claims, 6 Drawing Sheets

AUTOMATIC LOOP GAIN CONTROL APPARATUS

This application is a continuation of application Ser. No. 08/154,391 filed Nov. 18, 1993, which is a continuation of application Ser. No. 07/685,639 filed Apr. 16, 1991, both now abandoned.

BACKGROUND OF THE INVENTION

1. Field of the Invention

The present invention relates to an automatic loop gain control apparatus for maintaining the loop gain of an automatic control apparatus having a closed loop, and more particularly to an automatic loop gain control apparatus suitable for use in an optical information recording/reproduction apparatus.

2. Description of the Related Art

As information has come to be handled in large amounts in recent years, an optical information recording/reproduction apparatus (hereinafter referred to as an optical disk apparatus) that records or reproduces information on a recording medium by using a light beam has been attracting attention.

In order to record/reproduce information accurately, such an optical disk apparatus comprises a focusing servo system for adjusting the focus state of a light beam, a tracking servo system for adjusting the radiation state of a light beam with respect to the track of the light beam and the like.

In such a focusing servo system and a tracking servo system, since a tracking error with respect to the target position of a light beam for each system must be kept from ±1 to 0.1 micron, the open loop gain (hereinafter referred to simply as a loop gain) in the servo system is assumed to be 60 dB in low-frequency bands (15 or 30 Hz) by taking the surface vibration and eccentricity of the disk into consideration. An actuator for object lenses shows a gain peaking phenomenon due secondary resonance in bands above several KHz and due to the actuator's construction, causing a sharp phase degradation.

Therefore, in such a focusing servo system and in such a tracking servo system, it is difficult to obtain a sufficient phase margin and gain margin.

In such a servo control system which cannot obtain a sufficient phase and gain margin, a problem arises in that a variation in the loop gain degrades the stabilization of a system considerably.

Therefore, hitherto, an automatic loop gain control apparatus, such as disclosed in Japanese Patent Laid-Open No. 60-22746 (See FIG. 1), has been provided which suppresses a variation in the loop gain as much as possible.

This automatic loop gain control apparatus is designed to adjust its loop gain on the basis of the variation in the total light quantity of a multisplit sensor contained in a tracking and/or focusing servo control apparatus of an optical disk apparatus.

In the above-described automatic loop gain control apparatus, however, although variations in its loop gain due to changes in the refractive index of a recording medium or due to changes in laser power can be absorbed, the automatic loop gain control apparatus cannot cope with variations in its loop gain due to changes in the force constant of an actuator, changes in the sensitivity of an error detector, changes in its gain caused by circuit elements, or the like.

In order to solve such a problem, the automatic loop gain control apparatus disclosed in the Japanese Patent Laid-Open No. 1-169603 has been proposed. This automatic loop gain control apparatus is constructed as shown in FIG. 2.

A description will now be given specifically of the automatic loop gain control apparatus with reference to FIG. 2.

The automatic loop gain control apparatus adds a reference signal of a predetermined frequency to a closed loop, extracts a reference signal before and after this addition point by means of a band pass filter, adjusts the phase of the extracted respective reference signals, full-wave rectifies respective reference signals by means of an absolute value circuit, following which they are made into average values by means of a low-band pass filter, and inputs the respective signals to input terminals X and Y of a dividing circuit. The dividing circuit performs division in the form of Y/X and adjusts a variable gain amplifier so that the result of the division becomes a predetermined value.

According to this apparatus, changes in the loop gain of a closed loop system are directly measured, on the basis of which a variable gain amplifier is controlled to cause the loop gain to change. Therefore, not only variations in the loop gain resulting from changes in light quantity but also variations in the loop gain due to changes in the sensitivity of respective elements forming the closed loop are absorbed, and a stable servo operation can be performed.

However, since the above-mentioned conventional automatic loop gain control apparatus is formed of analog circuits, it is complex and expensive and its accuracy is not high. Also, the detection of the amplitude of a reference signal is performed by changing it into an average value by using a low-pass filter after full-wave rectification. As a consequence, problems arise in that the amplitude cannot be detected unless at least one cycle of a reference signal is taken in, the detection takes time, and realtime loop gain control cannot be performed.

Thus, there is a need for an automatic loop gain control apparatus which is simple in construction, inexpensive, has high accuracy, and is capable of performing the loop gain control of a servo control system in real time.

SUMMARY OF THE INVENTION

It is an object of the present invention to solve the problems of the prior art.

It is another object of the present invention to provide an automatic loop gain control apparatus which is simple in construction and inexpensive.

It is still another object of the present invention to provide an automatic loop gain control apparatus which has high accuracy and is capable of performing loop gain control of a servo control system in real time.

According to one aspect, the present invention which achieves these objectives relates to an automatic loop gain control apparatus in a servo control apparatus of a closed loop arrangement which positions a control object with respect to a reference. The apparatus comprises addition means for adding a reference signal of a predetermined frequency to a control signal in the closed loop, first detection means for detecting a peak value of predetermined frequency components of the control signal in a state before the control signal is input to the addition means at every predetermined cycle, and second detection means for detecting a peak value of predetermined frequency components of an output signal from the addition means at every predetermined cycle.

In one embodiment, the apparatus also comprises means for performing a digital computation using the peak value detected by the first detection means and for adjusting the gain of the closed loop on the basis of the result of the computation.

In another embodiment, the apparatus also comprises means for adjusting the gain of the control loop on the basis of a computation using the peak value detected by the first detection means and the peak value detected by the second detection means.

According to still another embodiment, the first and second detecting means detect an amplitude of the predetermined frequency components. In this embodiment, the apparatus further comprises means for performing a digital computation using the amplitude detected by the first detection means and the amplitude detected by the second detection means and for adjusting the gain of the control loop on the basis of the result of the computation.

In each embodiment, the control object is an optical information recording/reproduction head, the predetermined frequency is a central frequency of a frequency band of the control loop, and the control loop is a tracking and/or focusing servo loop.

The gain adjusting means determines the ratio of the peak value or amplitude detected by the first detection means to the peak value or amplitude detected by the second detection means and adjusts the gain the control loop in proportion to the determined ratio.

The apparatus can further comprise correlation detection means for determining the correlation between the output of the first detection means and the output of the second detection means. The gain adjusting means decreases the loop gain of the control loop by a predetermined ratio when the similarity of the outputs of the first and second detection means is low. In addition, the gain adjusting means determines the ratio of the peak value or amplitude detected by the first detection means to the peak value or amplitude detected by the second detection means and adjusts the gain of the control loop in proportion to the determined ratio when the similarity is high.

These and other objects, features, and advantages of the present invention will become clear when reference is made to the following detailed description of preferred embodiments of the present invention, and to the accompanying drawings.

DESCRIPTION OF THE PREFERRED EMBODIMENTS

The first embodiment of the present invention will be explained hereinbelow with reference to the accompanying drawings. An optical disk apparatus in which the present invention is embodied will now be explained with reference to FIG. 3.

Figure 1:
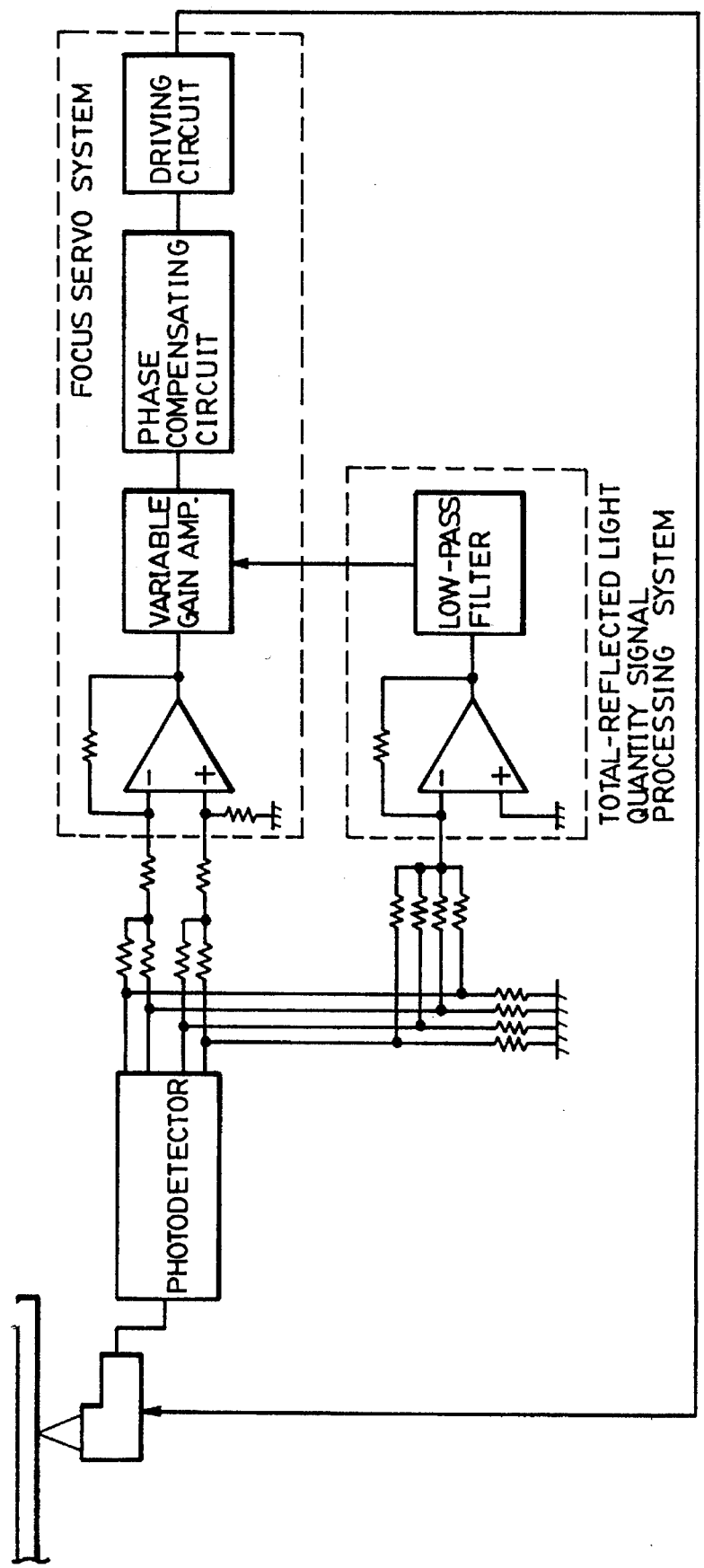
FIG. 1 is a block diagram showing a conventional automatic loop gain control apparatus.
Figure 2:
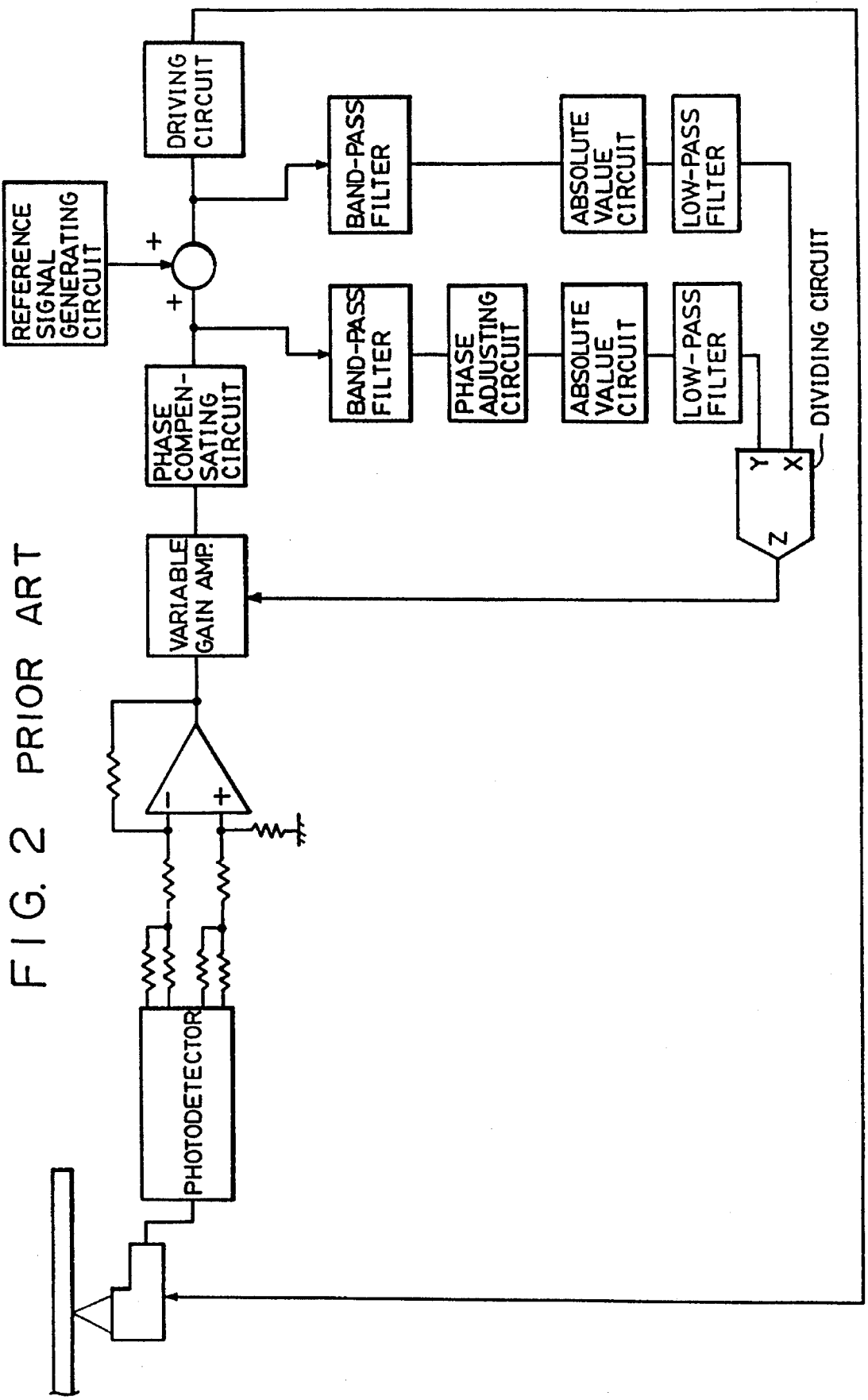
FIG. 2 is a block diagram showing another conventional automatic loop gain control apparatus.
Figure 3:
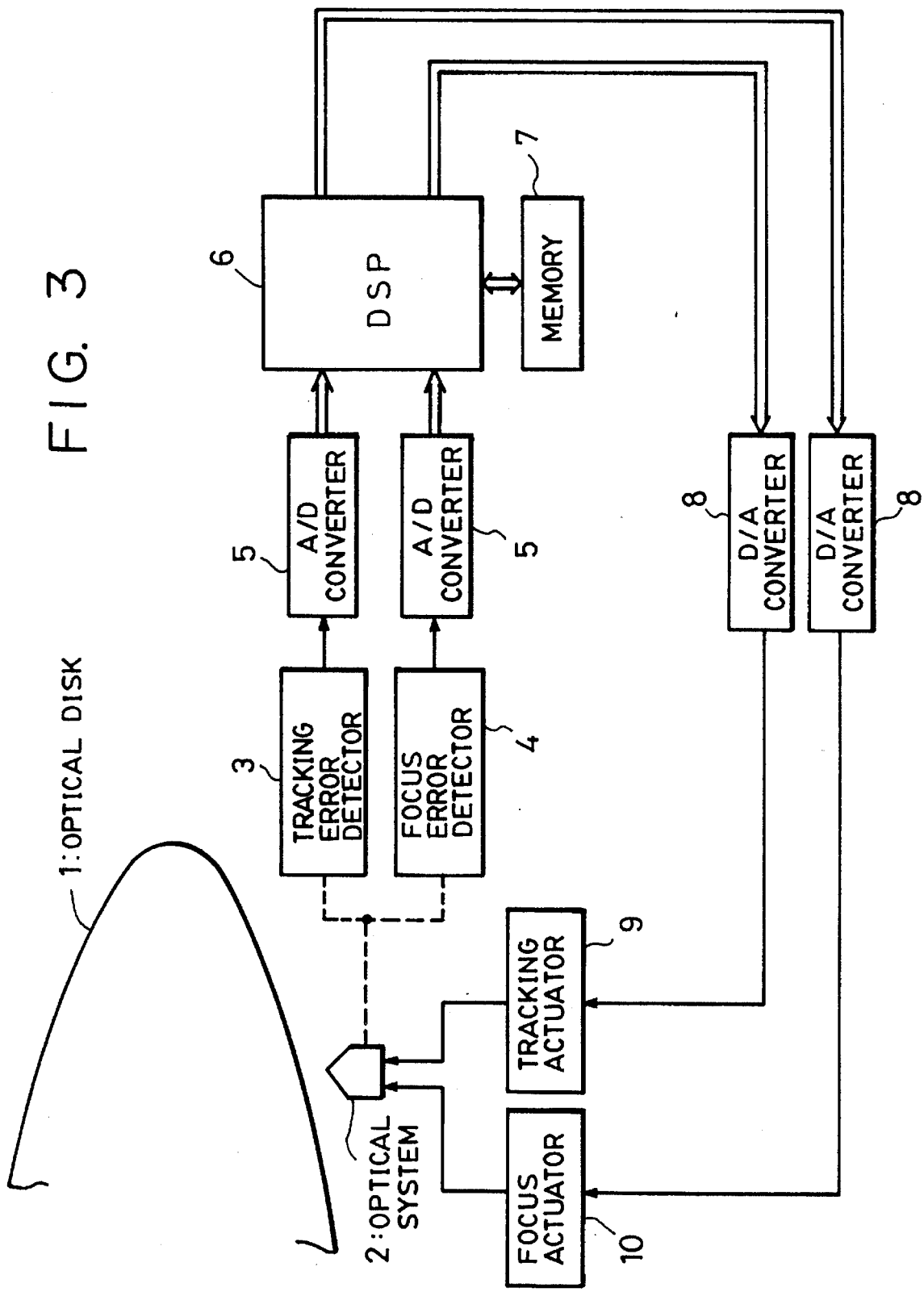
FIG. 3 is a block diagram showing the construction of an optical disk apparatus in which an automatic loop gain control apparatus of the present invention is embodied.

In FIG. 3, reference numeral 1 denotes an optical disk used as a recording medium, and reference numeral 2 denotes an optical system 2 of an optical head. Signals obtained by this optical system 2 reading optical disk 1 are input to a tracking error detector 3 and a focusing error detector 4. The detectors detect tracking error and focusing error signals, respectively, on the basis of the output of the optical system 2 by using a detection method in the optical disk apparatus which is well-known in the art. Reference numeral 5 denotes an analog-to-digital (A/D) converter that converts error signals output from the tracking error detector 3 and the focusing error detector 4, from analog into digital signals.

Reference numeral 6 denotes a digital signal processor (hereinafter referred to as a DSP) that performs various computations by using the A/D converted tracking error signal and focusing error signal so as to control all actuators which will be described later. The DSP 6 also controls the loop gain, as will be described later in detail. Reference numeral 7 denotes a memory which is used when the DSP 6 performs computations, 8 denotes a digital-to-analog (D/A) converter that converts the control quantity obtained by the DSP 6 from digital into analog signals; 9 denotes a tracking actuator that drives the optical system 2 in a tracking direction under the control of the DSP 6; and 10 denotes a focusing actuator under the control of the DSP 6 that drives the optical system 2 in a focusing direction.

Figure 4:
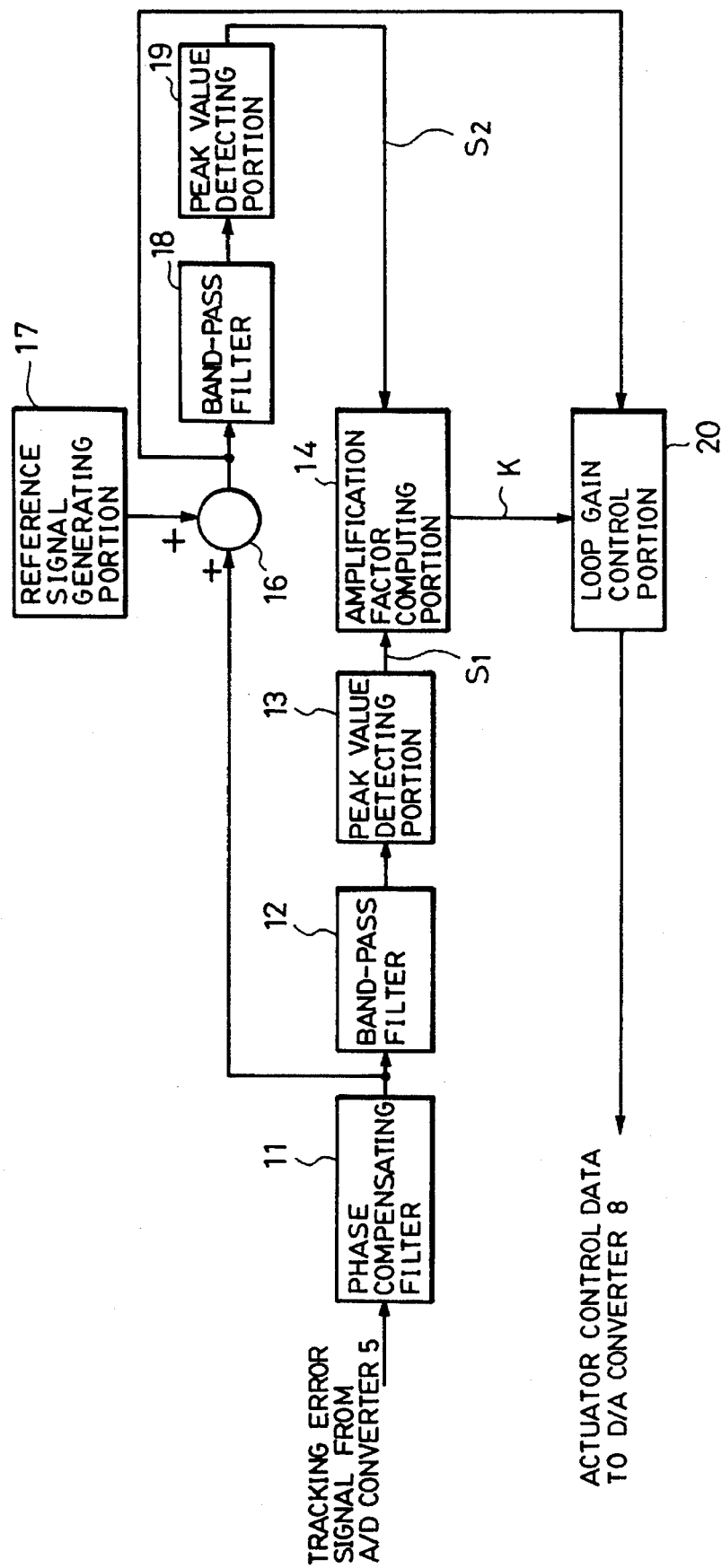
FIG. 4 is a block diagram showing a first embodiment of the automatic loop gain control apparatus of the present invention.

FIG. 4 is a block diagram showing an apparatus that automatically controls the loop gain of a servo control system in the embodiment shown in FIG. 3. In the present embodiment, the loop gain is automatically controlled by the DSP 6 shown in FIG. 3 by means of software. Therefore, FIG. 4 is a block diagram of functions equivalent to the DSP 6 in terms of hardware.

In FIG. 4, reference numeral 11 denotes a phase compensation filter that compensates for a phase deviation of a tracking servo system. Tracking error signals detected by the tracking error detector 3 of FIG. 3 are converted into digital signals by the A/D converter 5 and input to the DSP 6. The DSP 6 compensates for the phase deviation by inputting the tracking error signal to a phase compensation filter 11. In general, a phase compensation filter compensates for the phase deviation of the tracking error signal according to the following equation (1):

$$y(n) = 1/a_0 \{b_0 x(n) + b_1 x(n-1) + b_2 x(n-2) + \ldots + b_n x(0) - a_1 y(n-1) - a_2 y(n-2) \ldots - a_n y(0)\} \ldots (1),$$

where $y(n)$ is the nth output; $x(n)$ is the nth input; $b_0, b_1, \ldots b_n$ are each a coefficient corresponding to a delay time of each input; $a_0, a_1, \ldots a_n$ are each a coefficient corresponding to a delay time of each output; and $a_0$ is a coefficient for setting a predetermined gain.

As a result, an output signal which is phase-compensated by the phase compensation filter 11 is output to a band pass filter 12 and to an adder 16 as control data for the tracking actuator 9 shown in FIG. 3. The band pass filter 12 extracts a predetermined reference frequency component, in this embodiment, a central angular frequency $\omega_c$ of the frequency band of a tracking servo loop which will be described later. The band pass filter 12 can be constructed to perform in accordance with equation (1) described above. The extracted reference signal component is output to a peak value detection portion 13 where a peak value is detected. A detected peak value $S_1$ is output to an amplification factor computing portion 14.

Figure 5:
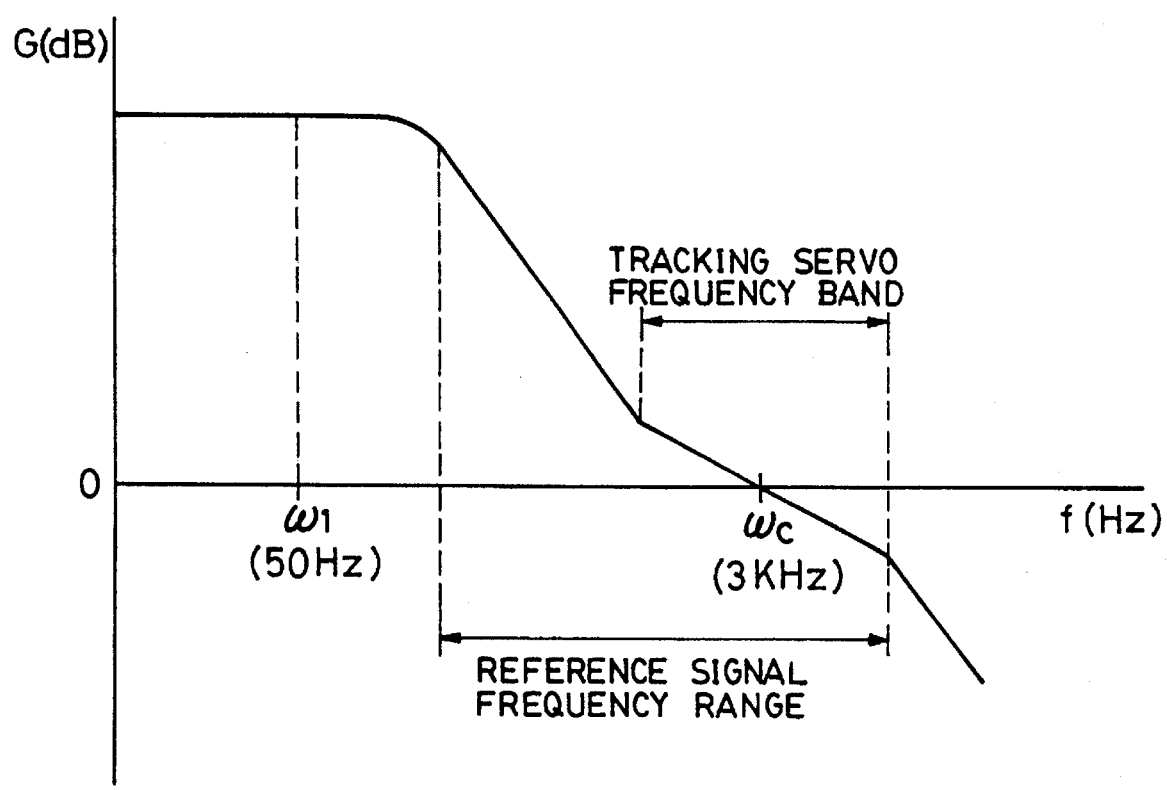
FIG. 5 is a view showing the frequency characteristics of the tracking servo system shown in FIG. 4.

Meanwhile, the output of the phase compensation filter 11 is sent to the adder 16, as mentioned above, where the output is added to a reference signal from a reference signal generation portion 17. In the present embodiment, the reference signal generation section 17, which generates a reference signal of a predetermined frequency, generates a reference signal of 3 KHz. The frequency characteristics of a tracking servo system of the present embodiment are shown in FIG. 5. $\omega_1$ in the figure denotes an angular frequency in the low bands, which is 50 Hz in the present embodiment. That is, the rotational frequency of the optical disk 1 shown in FIG. 3 is set at 50 Hz. According to this setting, frequency characteristics in the low bands are set. $\omega_c$ denotes a central angular frequency of frequency bands of a tracking servo loop, which is 3 KHz in the present embodiment. Therefore, in the present embodiment, the reference signal frequency of the reference signal generation section 17 is set at 3 KHz which is the same as the central angular frequency $\omega_c$. The band pass filter 12 is also set in such a manner as to extract the same frequency component as $\omega_c$, as described above.

In this way the control data added to the reference signal by the adder 16 is output to a band pass filter 18 and to a loop gain control portion 20. The band pass filter 18 extracts the central angular frequency $\omega_c$ component of the tracking servo loop in the same manner as in the band pass filter 12 and outputs it to a peak value detection section 19. The peak value detection section 19 detects a peak value in the same manner as in the peak value detecting portion 13, designates the peak value to be $S_2$, and outputs it to the amplification factor computing section 14. The amplification factor computing portion 14 computes an amplification factor $K=S_2/S_1$ of the two values: the peak value $S_1$ output from the peak value detection portion 13 and the peak value $S_2$ output from the peak value detection portion 19. That is, the existing value of the loop gain is computed by determining the ratio of the signal level before one round of the servo loop to the signal level after one round of the servo loop. The obtained amplification factor K is sent to the loop gain control section 20 which controls the loop gain.

The loop gain control portion 20 multiplies the control data sent from the adder 16 by an arbitrary value A ($A=Q\times K$) and outputs it, where Q can be freely selected by portion 20 and K is the amplification factor outputted by amplification factor computing portion 14. In this case, the loop gain control section 20 varies a multiple Q of the control data so that the amplification factor K sent from the amplification factor computing section 14 becomes a predetermined value. That is, a variation in the loop gain of the tracking servo system is compensated for by adjusting the multiple of the control data so that K becomes a predetermined value. Accordingly, if K is smaller than the predetermined value, an adjustment is made such that the multiple Q of the control data is increased; if K is greater than the predetermined value, an adjustment is made such that the multiple Q of control data is decreased. This operation of controlling the loop gain is performed each time a tracking error signal is sampled. The control data of the loop gain control portion 20 obtained in this manner is output to the D/A converter 8 where the data is converted to an analog value. Thus, the tracking actuator 9 is driven by an analog instruction signal output from the D/A converter 8.

In the present embodiment, the loop gain is controlled so that the above-mentioned value of K becomes 1. The angular frequencies extracted by the band pass filters 12 and 18, and the angular frequency generated by the reference signal generation section 17, are set to a central angular frequency $\omega_c$ of the frequency band of the tracking servo loop, as shown in FIG. 5. Therefore, since the gain of this $\omega_c$ is 0 (dB), as can be seen from FIG. 5, it is set so that K becomes 1. Although K should preferably be set at 1, the frequency should be set within the range of a reference signal frequency range shown in FIG. 5, and at this time K should be set in proportion to the gain corresponding to that frequency.

Next, the second embodiment of the present invention will be explained.

The present second embodiment is one in which the loop gain of a servo control system can be adjusted properly even if the servo control system becomes abnormal due to an oscillation.

Figure 6:
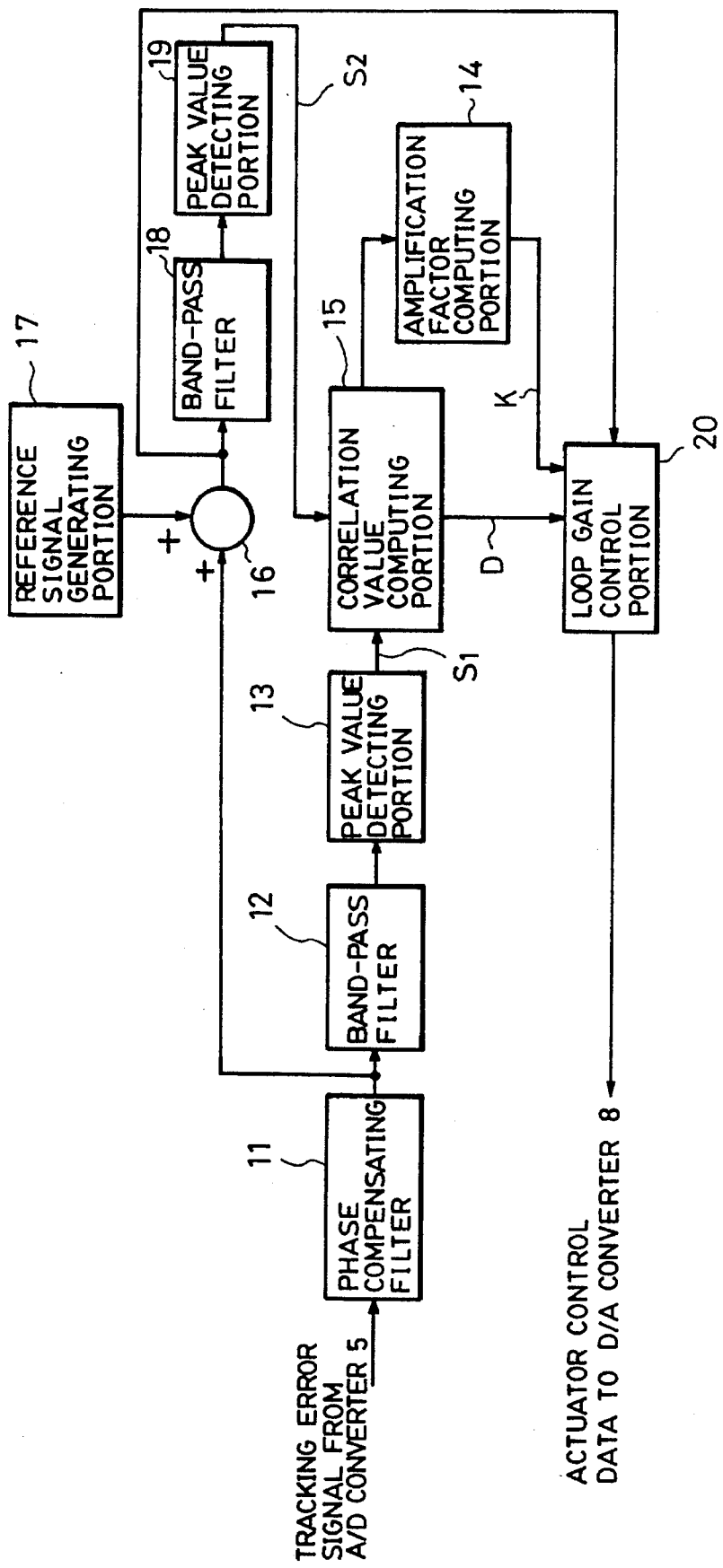
FIG. 6 is a block diagram showing a second embodiment of the automatic loop gain control apparatus of the present invention.

FIG. 6 is a block diagram showing an automatic loop gain control apparatus of the second embodiment of the present invention.

Parts which are given the same reference numerals as those of the preceding figures indicate the same parts, and thus a detailed explanation thereof is omitted.

The functions shown in FIG. 6 are performed by the DSP 6 shown in FIG. 3 by means of software. Therefore, FIG. 6 is a functions block diagram equivalent to it in terms of hardware.

A description will now be provided of the operation of an automatic loop gain control apparatus.

A tracking error signal detected by the tracking error detector 3 of FIG. 3 is converted to a digital value by means of the A/D converter 5 and input to the DSP 6. The DSP 6 first compensates for the phase deviation by inputting the tracking error signal to the phase compensation filter 11. The output signal which is phase-compensated by the phase compensation filter 11 is output to the band pass filter 12 and to the adder 16 as control data for the tracking actuator 9 shown in FIG. 3.

The band pass filter 12 extracts a predetermined reference frequency signal component, in the present embodiment, a central angular frequency $\omega_c$ of the frequency band of a tracking servo loop which will be described later. The extracted reference signal components are output to the peak value detection portion 13 where its peak value is detected. The detected peak value $S_1$ is output to a correlation value computing portion 15.

Meanwhile, the output of the phase compensation filter 11 is sent to the adder 16, as mentioned earlier, and is added to the reference signal from the reference signal generation portion 17. In the present second embodiment, the reference signal generation portion 17, which generates a reference signal of a predetermined frequency, generates a reference signal of 3 KHz which is the same as the central angular frequency $\omega_c$ of the frequency band of a tracking servo loop as in the first embodiment.

The control data added to the reference signals by the adder 16 in this manner is output to the band pass filter 18 and to the loop gain control portion 20. The band pass filter 18 extracts the central angular frequency $\omega_c$ component of the frequency band of a tracking servo loop in the same manner as the band pass filter 12 and outputs it to the peak value detection portion 19. The peak value detection portion 19 detects a peak value in the same manner as in the peak value detection portion 13, designates it to be $S_2$, and outputs it to the correlation value computing portion 15. The correlation value computing portion 15 determines a correlation factor of the two values: the peak value $S_1$ output from the peak value detection portion 13 and the peak value $S_2$ output from the peak value detection portion 19. A method of determining the correlation factor is shown below:

$$\gamma_{xy}(k) = \frac{1}{N\sigma_x\sigma_y} \sum_{p=0}^{N-1} (x_p - \bar{x})(y_{p+k} - \bar{y}) \text{ (correlation function)}$$

x: peak value of reference signal before adder
y: peak value of reference signal after adder
$\sigma_x$, $\sigma_y$: standard deviation
$x_p$, $y_p$: sample value series
$\bar{x}$, $\bar{y}$: average value of $x_p$, $y_p$ respectively Where the correlation factor is smaller than a predetermined value ($\eta$=0.8) as a result of the determination in the above manner, that is, where the similarity of the two detection signals is low (i.e., where the servo control system is oscillating), a predetermined attenuation factor D (D<1) is sent to the loop gain control portion 20. The loop gain control portion 20 sets the amplification factor in the loop gain control section 20 to a multiple of A (A=P * D), where P is a preset multiplication factor of the reference frequency of the control loop system, on the basis of this attenuation factor D. That is, the loop gain is forceably decreased to attenuate the oscillation of the servo control system. The control data sent from the adder 16 is multiplied by A and is output.

Next, where the correlation factor is greater than a predetermined value, that is, where the similarity of the two detection signals is high (where the servo control system is not oscillating), the amplification factor computing portion 14 computes an amplification factor $K=S_2/S_1$ of the two values: the peak value $S_1$ output from the peak value detection portion 13 and the peak value $S_2$ output from the peak value detection portion 19. That is, the existing value of the loop gain is computed by determining the ratio of the signal level before one round of the servo loop to the signal level after one round of the servo loop. The amplification factor K, thus determined, is sent to the loop gain control portion 20 which controls the loop gain.

The loop gain control section 20 multiplies the control data sent from the adder 16 by an arbitrary value B (B=Q×K) and outputs it. In this case, the loop gain control section 20 varies a multiple Q of the control data so that the amplification factor K sent from the amplification factor computing portion 14 becomes a predetermined value (e.g., K=1). That is, a variation in the loop gain of the tracking servo system is compensated for by adjusting a multiple Q of the control data so that K becomes a predetermined value. Accordingly, if K is smaller than the predetermined value, an adjustment is made such that the multiple Q of the control data is increased; if K is greater than the predetermined value, an adjustment is made such that the multiple Q of the control data is decreased. This operation of controlling the loop gain is performed each time a tracking error signal is sampled. However, the actual adjustment of the loop gain is performed each time a peak value is detected. The control data of the loop gain control section 20 obtained in this manner is output to the D/A converter 8 where the data is converted to an analog value. Thus, the tracking actuator 9 is driven by an analog instruction signal output from the D/A converter 8.

In the present embodiment, the loop gain is controlled so that the above-mentioned value of K becomes 1. The angular frequencies extracted by the band pass filters 12 and 18, and the angular frequency generated by the reference signal generation portion 17 are set to a central angular frequency $\omega_c$ of the frequency band of a tracking servo loop, as in the first embodiment. Therefore, since the gain of this $\omega_c$ is 0 (dB), as can be seen from FIG. 5, the angular frequency is set so that K becomes 1. Although K should preferably be set at 1, the frequency should be set within the range of a reference signal frequency range shown in FIG. 5, and at this time K should be determined proportionally to the gain corresponding to the frequency.

In the above-described embodiments, an explanation was made with reference to a tracking servo. Of course, the present invention is also effective in control apparatuses of focusing servos and other closed loops.

Various methods of determining the correlation factor are within the scope of the present invention and are not limited to the above-mentioned correlation function.

In the present invention, as has been explained above, the automatic loop gain control apparatus is simple, inexpensive, and highly accurate because it is comprised of digital circuits. Also, since the amplitude of a reference signal is detected by peak value detection, loop gain control can be performed on detection of a peak value. Thus, a real time loop gain control is made possible.

In the above embodiment, a reference signal is applied to the output signal of the phase compensation filter 11. However, needless to say, the present invention can be performed by a method in which a reference signal is applied to tracking error signals before the phase compensation filter 11 and tracking error signals before and after the filter are used.

The individual components represented by the blocks shown in FIG. 3 are well known in the automatic loop gain control art and/or the optical information recording/reproducing art and their specific construction and operation is not critical to the invention or the best mode for carrying out the invention. Moreover, the functions illustrated in FIGS. 4 and 6 can be easily programmed into well known digital signal processors by persons of ordinary skill in the art and since such programming per se is not part of the invention no further description thereof is deemed necessary.

Many different embodiments of the present invention can be made without departing from the spirit and scope thereof, therefore, it is to be understood that this invention is not limited to the specific embodiments thereof except as defined in the appended claims.

What is claimed is:

1. A servo control apparatus of a closed loop arrangement which positions a control object with respect to a reference, comprising:

displacement position detection means for detecting a displacement position of the control object with respect to the reference and generating an analog signal of position displacement;

an analog-to-digital converter for converting the analog signal to a digital signal at a predetermined sampling period so as to sample the analog signal a plurality of times during a plurality of predetermined sampling periods;

addition means for adding a reference signal of a predetermined frequency to the digital signal in the closed loop;

first detection means for detecting a peak value of predetermined frequency components of the digital signal before the digital signal is input to said addition means and for outputting a first digital output signal representing the peak value detected by said first detection means;

second detection means for detecting a peak value of predetermined frequency components of an output signal output from said addition means and for outputting a second digital output signal representing the peak value detected by said second detection means; and control means for receiving the first and second digital output signals and for controlling a gain of the closed loop a plurality of times during the plurality of predetermined sampling periods by using said first and second digital output signals.

2. A servo control apparatus according to claim 1, wherein the control object is an optical information recording/reproduction head.

3. A servo control apparatus according is claim 1, wherein the predetermined frequency is a central frequency of a frequency band of the closed loop.

4. A servo control apparatus according to claim 2, wherein the closed loop is a tracking and/or focusing servo loop.

5. A servo control apparatus according to claim 1, wherein said control means determines the ratio of said first digital output signal and said second digital output signal and adjusts the gain of said closed loop in accordance with the ratio.

6. An optical information recording/reproducing apparatus having a closed loop controlling a position of an objective lens by using a signal representing the relative position of the objective lens with respect to a recording medium for adjusting an irradiation state of a beam spot on the medium, comprising:

relative position detection means for detecting the relative position of the objective lens with respect to the medium and generating an analog signal of the relative position thereof;

an analog-to-digital converter for converting the analog signal to a digital signal at a predetermined sampling period so as to sample the analog signal a plurality of times during the plurality of predetermined sampling periods;

addition means for adding a reference signal of a predetermined frequency to the digital signal in the closed loop;

first detection means for detecting a peak value of predetermined frequency components of the digital signal before the digital signal is input to said addition means and for outputting a first digital output signal representing the peak value detected by said first detection means;

second detection means for detecting a peak value of predetermined frequency components of a digital output signal output from said addition means and for outputting a second digital output signal representing the peak value detected by said second detection means; and control means for receiving the first and second digital output signals and for controlling a gain of the closed loop a plurality of times during the plurality of predetermined sampling periods by using the first and second digital output signals.

7. An optical information recording/reproducing method having a servo loop controlling a position of an objective lens by using a signal representing the relative position of the objective lens with respect to a recording medium for adjusting an irradiation state of a beam spot on the recording medium, comprising:

a position detection step for detecting the relative position of the objective lens with respect to the medium and generating an analog signal of the relative position thereof;

an analog-to-digital converting step for converting the analog signal generated in said position detection step to a digital signal at a predetermined sampling period so as to sample the analog signal a plurality of times during a plurality of the predetermined sampling periods;

an addition step for adding a reference signal of a predetermined frequency to the digital signal at a predetermined point in the servo loop;

a first detection step for detecting the peak value of predetermined frequency components of the digital signal before the predetermined point in the servo loop and for outputting a first digital output signal representing the peak value detected in said first detection step;

a second detection step for detecting the peak value of predetermined frequency components of the digital signal behind the predetermined point in the servo loop and for outputting a second digital output signal representing the peak value detected in said second detection step; and a controlling step for controlling the gain of the servo loop a plurality of times during the plurality of the predetermined sampling periods by using the first digital output signal outputted in said first detection step and the second digital output signal outputted in said second detection step.

8. A servo control apparatus of a closed loop arrangement which positions a control object with respect to a reference, comprising:

displacement position detection means for detecting a displacement position of the control object with respect to the reference and generating a signal of position displacement;

addition means for adding a reference signal of a predetermined frequency to the position displacement signal in the closed loop;

first detection means for detecting a peak value of predetermined frequency components of the position displacement signal before the position displacement signal is input to said addition means and for outputting a first output signal representing the peak value detected by said first detection means;

second detection means for detecting a peak value of predetermined frequency components of an output signal output from said addition means and for outputting a second output signal representing the peak value detected by said second detection means;

correlation value computing means, receiving the first and second output signals, for calculating a correlation factor correlating the first and second output signals;

an amplification factor computing means, separate from said correlation value computing means, for computing an amplification factor from the first and second output signals comprising the ratio of the peak values represented by the first and second output signals;

adjustment means for receiving said correlation factor and amplification factor and for adjusting a gain of the closed loop by using the amplification factor when the correlation factor is above a predetermined value and forcibly decreasing a gain of the closed loop when the correlation factor is below the predetermined value on the basis of a predetermined attenuation factor; and moving means for moving the control object according to the position displacement signal amplified based upon the gain adjusted by said adjustment means.

9. An optical information recording/reproducing apparatus having a closed loop controlling a position of an objective lens by using a signal representing the relative position of the objective lens with respect to a recording medium for adjusting an irradiation state of a beam spot on the medium, comprising:

relative position detection means for detecting the relative position of the objective lens with respect to the medium and generating a signal of the relative position thereof;

addition means for adding a reference signal of a predetermined frequency to the relative position signal in the closed loop;

first detection means for detecting a peak value of predetermined frequency components of the relative position signal before the relative position signal is input to said addition means and for outputting a first output signal representing the peak value detected by said first detection means;

second detection means for detecting a peak value of predetermined frequency components of an output signal output from said addition means and for outputting a second output signal representing the peak value detected by said second detection means;

correlation value computing means, receiving the first and second output signals, for calculating a correlation value correlating the first and second output signals;

an amplification factor computing means, separate from said correlation value computing means, for computing an amplification factor from the first and second output signals comprising the ratio of peak values represented by the first and second output signals;

adjustment means for receiving said correlation factor and for adjusting a gain of the closed loop by using the amplification factor when the correlation value is above a predetermined value and forcibly decreasing a gain of the closed loop when the correlation value is below the predetermined value, on the basis of a predetermined attenuation factor; and moving means for moving the objective lens according to the relative position signal amplified based upon the gain adjusted by said adjustment means.

10. An optical information recording/reproducing method having a servo loop controlling a position of an objective lens by using a signal representing the relative position of the objective lens with respect to a recording medium for adjusting an irradiation state of a beam spot on the recording medium, comprising:

a position detection step for detecting the relative position of the objective lens with respect to the medium and generating a signal of the relative position thereof;

an addition step for adding a reference signal of a predetermined frequency to the relative position signal at a predetermined point in the servo loop;

a first detection step for detecting the peak value of predetermined frequency components of the relative position signal before the predetermined point in the servo loop and for outputting a first output signal representing the peak value detected in said first detection step;

a second detection step for detecting the peak value of predetermined frequency components of the relative position signal behind the predetermined point in the servo loop and for outputting a second output signal representing the peak value detected in said second detection step;

a correlation value computing step for receiving the first and second output signals and for calculating a correlation value correlating the first and second output signals;

an amplification factor computing step for computing an amplification factor from the first and second output signals comprising the ratio of the peak values represented by the first and second output signals;

an adjustment step for adjusting the gain of the servo loop by using the amplification factor when the correlation value is greater than a predetermined value and forcibly decreasing the gain of the servo loop when the correlation value is less than the predetermined value on the basis of a predetermined attenuation factor; and a moving step for moving the objective lens according to the relative position signal amplified based upon the gain adjusted in said adjustment step.

11. A servo control apparatus of a closed loop arrangement which positions a control object with respect to a reference, comprising:

displacement position detection means for detecting a displacement position of the control object with respect to the reference and generating a signal of position displacement;

addition means for adding a reference signal of a predetermined frequency to the position displacement signal in the closed loop;

first detection means for detecting a peak value of predetermined frequency components of the position displacement signal before the position displacement signal is input to said addition means and for outputting a first output signal representing the peak value detected by said first detection means;

second detection means for detecting a peak value of predetermined frequency components of an output signal output from said addition means and for outputting a second output signal representing the peak value detected by said second detection means;

correlation value computing means, receiving the first and second output signals, for calculating a correlation factor correlating the first and second output signals according to the formula:

$$\gamma_{xy}(k) = \frac{1}{N\sigma_x\sigma_y} \sum_{p=0}^{N-1} (x_p - \bar{x})(y_{p+k} - \bar{y}),$$

where x is the peak value represented by the first output signal, y is the peak value represented by the second output signal, $\sigma_x$ and $\sigma_y$ are standard deviations for x and y, respectively, $x_p$ and $y_p$ are sample value series, and $\bar{x}$ and $\bar{y}$ are average values of $x_p$ and $y_p$, respectively;

amplification factor computing means for computing an amplification factor from the first and second output signals;

adjustment means for receiving said correlation factor and amplification factor and for adjusting a gain of the closed loop by using the amplification factor when the correlation factor is high and forcibly decreasing a gain of the closed loop when the correlation factor is low; and moving means for moving the control object according to the position displacement signal amplified based upon the gain adjusted by said adjustment means.

12. An optical information recording/reproducing apparatus having a closed loop controlling a position of an objective lens by using a signal representing the relative position of the objective lens with respect to a recording medium for adjusting an irradiation state of a beam spot on the medium, comprising:

relative position detection means for detecting the relative position of the objective lens with respect to the medium and generating a signal of the relative position thereof;

addition means for adding a reference signal of a predetermined frequency to the relative position signal in the closed loop;

first detection means for detecting a peak value of predetermined frequency components of the relative position signal before the relative position signal is input to said addition means and for outputting a first output signal representing the peak value detected by said first detection means;

second detection means for detecting a peak value of predetermined frequency components of an output signal output from said addition means and for outputting a second output signal representing the peak value detected by said second detection means;

correlation value computing means, receiving the first and second output signals, for calculating a correlation value correlating the first and second output signals in accordance with the following formula:

$$\gamma_{xy}(k) = \frac{1}{N\sigma_x\sigma_y} \sum_{p=0}^{N-1} (x_p - \bar{x})(y_{p+k} - \bar{y}),$$

where x is the peak value represented by the first output signal, y is the peak value represented by the second output signal, $\sigma_x$ and $\sigma_y$ are standard deviations for x and y, respectively, $x_p$ and $y_p$ are sample value series, and $\bar{x}$ and $\bar{y}$ are average values of $x_p$ and $y_p$, respectively;

amplification factor computing means for computing an amplification factor from the first and second output signals;

adjustment means for receiving said correlation value and for adjusting a gain of the closed loop by using the amplification factor when the correlation value is high and forcibly decreasing a gain of the closed loop when the correlation value is low; and moving means for moving the objective lens according to the relative position signal amplified based upon the gain adjusted by said adjustment means.

13. An optical information recording/reproducing method having a servo loop controlling a position of an objective lens by using a signal representing the relative position of the objective lens with respect to a recording medium for adjusting an irradiation state of a beam spot on the recording medium, comprising:

a position detection step for detecting the relative position of the objective lens with respect to the medium and generating a signal of the relative position thereof;

an addition step for adding a reference signal of a predetermined frequency to the relative position signal at a predetermined point in the servo loop;

a first detection step for detecting the peak value of predetermined frequency components of the relative position signal before the predetermined point in the servo loop and for outputting a first output signal representing the peak value detected in said first detection step;

a second detection step for detecting the peak value of predetermined frequency components of the relative position signal behind the predetermined point in the servo loop and for outputting a second output signal representing the peak value detected in said second detection step;

a correlation value computing step for receiving the first and second output signals and for calculating a correlation value correlating the first and second output signals in accordance with the following formula:

$$\gamma_{xy}(k) = \frac{1}{N\sigma_x\sigma_y} \sum_{p=0}^{N-1} (x_p - \bar{x})(y_{p+k} - \bar{y}),$$

where x is the peak value represented by the first output signal, y is the peak value represented by the second output signal, $\sigma_x$ and $\sigma_y$ are standard deviations for x and y, respectively, $x_p$ and $y_p$ are sample value series, and $\bar{x}$ and $\bar{y}$ are average values of $x_p$ and $y_p$, respectively;

amplification factor computing step for computing an amplification factor from the first and second output signals;

an adjustment step for adjusting the gain of the servo loop by using the amplification factor when the correlation value is high and forcibly decreasing the gain of the servo loop when the correlation value is low; and a moving step for moving the objective lens according to the relative position signal amplified based upon the gain adjusted in said adjustment step.

* * * * *

UNITED STATES PATENT AND TRADEMARK OFFICE
CERTIFICATE OF CORRECTION

PATENT NO. : 5,583,837
DATED : December 10, 1996
INVENTOR(S) : TSUKASA OGINO, ET AL.

It is certified that error appears in the above-indentified patent and that said Letters Patent is hereby corrected as shown below:

ON THE COVER PAGE:

Item: [56] References Cited

FOREIGN PATENT DOCUMENTS

"1169603" should be deleted.

COLUMN 1:

Line 40, "due" should read --due to--.

UNITED STATES PATENT AND TRADEMARK OFFICE
CERTIFICATE OF CORRECTION

PATENT NO. : 5,583,837
DATED : December 10, 1996
INVENTOR(S) : TSUKASA OGINO, ET AL.

It is certified that error appears in the above-indentified patent and that said Letters Patent is hereby corrected as shown below:

COLUMN 9:

Line 12, "is" should read --to--.

Signed and Sealed this

Twentieth Day of May, 1997

Attest:

BRUCE LEHMAN

Attesting Officer

Commissioner of Patents and Trademarks